United States Patent
Ekambaram et al.

(10) Patent No.: US 10,824,995 B2
(45) Date of Patent: Nov. 3, 2020

(54) COMMUNICATION ENRICHMENT RECOMMENDATION

(71) Applicant: International Business Machines Corporation, Armonk, NY (US)

(72) Inventors: Vijay Ekambaram, Chennai (IN); Atri Mandal, Bangalore (IN); Giriprasad Sridhara, Bangalore (IN); Gargi Banerjee Dasgupta, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 35 days.

(21) Appl. No.: 15/970,449

(22) Filed: May 3, 2018

(65) Prior Publication Data

US 2019/0340574 A1     Nov. 7, 2019

(51) Int. Cl.
  *G06Q 10/10*    (2012.01)
  *H04L 29/08*    (2006.01)
  *G06F 9/451*    (2018.01)

(52) U.S. Cl.
  CPC ........... *G06Q 10/107* (2013.01); *G06F 9/453* (2018.02); *H04L 67/32* (2013.01)

(58) Field of Classification Search
  None
  See application file for complete search history.

(56) References Cited

U.S. PATENT DOCUMENTS

| | | |
|---|---|---|
| 6,970,908 B1 | 11/2005 | Larky et al. |
| 7,178,099 B2 | 2/2007 | Meyer et al. |
| 7,716,217 B2 | 5/2010 | Marston et al. |
| 8,135,612 B1 * | 3/2012 | Scudder ............... G06Q 10/02 705/7.14 |
| 8,185,591 B1 | 5/2012 | Lewis |
| 9,250,993 B2 | 2/2016 | Mani et al. |
| 2002/0123983 A1 * | 9/2002 | Riley ................... G06Q 10/00 |
| 2007/0233459 A1 | 10/2007 | Perronnin |
| 2008/0162651 A1 | 7/2008 | Madnani |

(Continued)

*Primary Examiner* — Clayton R Williams
*Assistant Examiner* — Christopher B Robinson
(74) *Attorney, Agent, or Firm* — Ference & Associates LLC

(57) ABSTRACT

One embodiment provides a method for use within an organization having a plurality of groups dedicated to providing assistance with requests, including: obtaining a communication comprising a request for assistance from a user; identifying, using information contained within the obtained communication, a group that is able to provide assistance in resolving the request, each group having a corresponding model identifying information needed by that group; determining, based upon a model corresponding to the identified group, information needed by the identified group to resolve the request; identifying at least one modification that needs to be made to the communication based upon the determined information, wherein the identifying at least one modification comprises determining a difference between the determined information and the information contained within the obtained communication; and sending a modified communication to the identified group, wherein the modified communication comprises the obtained communication having at least one incorporated identified modification.

19 Claims, 4 Drawing Sheets

(56) References Cited

U.S. PATENT DOCUMENTS

| | | |
|---|---|---|
| 2009/0089377 A1 | 4/2009 | Rubinger |
| 2011/0289161 A1 | 11/2011 | Rankin, Jr. et al. |
| 2013/0046764 A1 | 2/2013 | Choi et al. |
| 2013/0125017 A1 | 5/2013 | Kaghazian |
| 2013/0132060 A1* | 5/2013 | Badhe .................. G06F 16/355 703/22 |
| 2015/0347368 A1 | 12/2015 | Carlen et al. |
| 2016/0110723 A1 | 4/2016 | Shimpi et al. |
| 2016/0357859 A1 | 12/2016 | Agarwal et al. |
| 2017/0103400 A1 | 4/2017 | Agarwal et al. |
| 2017/0161335 A1 | 6/2017 | Akula et al. |
| 2017/0316438 A1* | 11/2017 | Konig .................. G06Q 30/016 |
| 2018/0197072 A1* | 7/2018 | Hausler ................ G06F 40/279 |
| 2018/0241881 A1* | 8/2018 | Li ........................ G06Q 30/016 |
| 2018/0322462 A1* | 11/2018 | Jayaraman ............. G06N 20/00 |

\* cited by examiner

COMMUNICATION ENRICHMENT RECOMMENDATION

BACKGROUND

In order to solve problems or assist users with performing tasks, many entities employ help desks or customer service centers. When the user is experiencing a problem or needs assistance, the user can send a communication (e.g., email, service ticket through an application, instant message, etc.) to the help desk. For example, if the user is experiencing problems with a computer application, the user may submit a help ticket so that the information technology center can fix the problem. As another example, if a user needs assistance booking travel, the user may submit a service ticket to a travel customer center to assist in booking the travel. Upon receiving the help or customer service ticket, the help desk or customer service center can analyze the request and perform the necessary steps to resolve the problem or request within the ticket.

BRIEF SUMMARY

In summary, one aspect of the invention provides a method for use within an organization having a plurality of groups dedicated to providing assistance with requests, comprising: obtaining a communication comprising a request for assistance from a user; identifying, using information contained within the obtained communication, a group that is able to provide assistance in resolving the request, each group having a corresponding model identifying information needed by that group for resolving requests; determining, based upon a model corresponding to the identified group, information needed by the identified group to resolve the request; identifying at least one modification that needs to be made to the communication based upon the determined information, wherein the identifying at least one modification comprises determining a difference between the determined information and the information contained within the obtained communication; and sending a modified communication to the identified group, wherein the modified communication comprises the obtained communication having at least one incorporated identified modification.

Another aspect of the invention provides an apparatus for use within an organization having a plurality of groups dedicated to providing assistance with requests, comprising: at least one processor; and a computer readable storage medium having computer readable program code embodied therewith and executable by the at least one processor, the computer readable program code comprising: computer readable program code configured to obtain a communication comprising a request for assistance from a user; computer readable program code configured to identify, using information contained within the obtained communication, a group that is able to provide assistance in resolving the request, each group having a corresponding model identifying information needed by that group for resolving requests; computer readable program code configured to determine, based upon the model corresponding to the identified group, information needed by the identified group to resolve the request; computer readable program code configured to identify at least one modification that needs to be made to the communication based upon the determined information, wherein the identifying at least one modification comprises determining a difference between the determined information and the information contained within the obtained communication; and computer readable program code configured to send a modified communication to the identified group, wherein the modified communication comprises the obtained communication having at least one incorporated identified modification.

An additional aspect of the invention provides a computer program product for use within an organization having a plurality of groups dedicated to providing assistance with requests, comprising: a computer readable storage medium having computer readable program code embodied therewith, the computer readable program code executable by a processor and comprising: computer readable program code configured to obtain a communication comprising a request for assistance from a user; computer readable program code configured to identify, using information contained within the obtained communication, a group that is able to provide assistance in resolving the request, each group having a corresponding model identifying information needed by that group for resolving requests; computer readable program code configured to determine, based upon the model corresponding to the identified group, information needed by the identified group to resolve the request; computer readable program code configured to identify at least one modification that needs to be made to the communication based upon the determined information, wherein the identifying at least one modification comprises determining a difference between the determined information and the information contained within the obtained communication; and computer readable program code configured to send a modified communication to the identified group, wherein the modified communication comprises the obtained communication having at least one incorporated identified modification.

A further aspect of the invention provides a method for use within an organization having a plurality of customer service resolution groups dedicated to providing assistance with requests, comprising: obtaining a customer service communication, wherein the customer service communication comprises a request by a user for assistance; identifying, using information included in the customer service communication, a customer service resolution group for resolving the request; analyzing, using a model corresponding to the identified customer service resolution group and identifying information needed by the identified customer service resolution group to resolve requests, the obtained customer service communication and identifying at least one information component needed by the identified customer service resolution group and missing from the obtained customer service communication; modifying the obtained customer service communication to include the missing at least one information component; and sending the modified customer service communication to the identified customer service resolution group.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
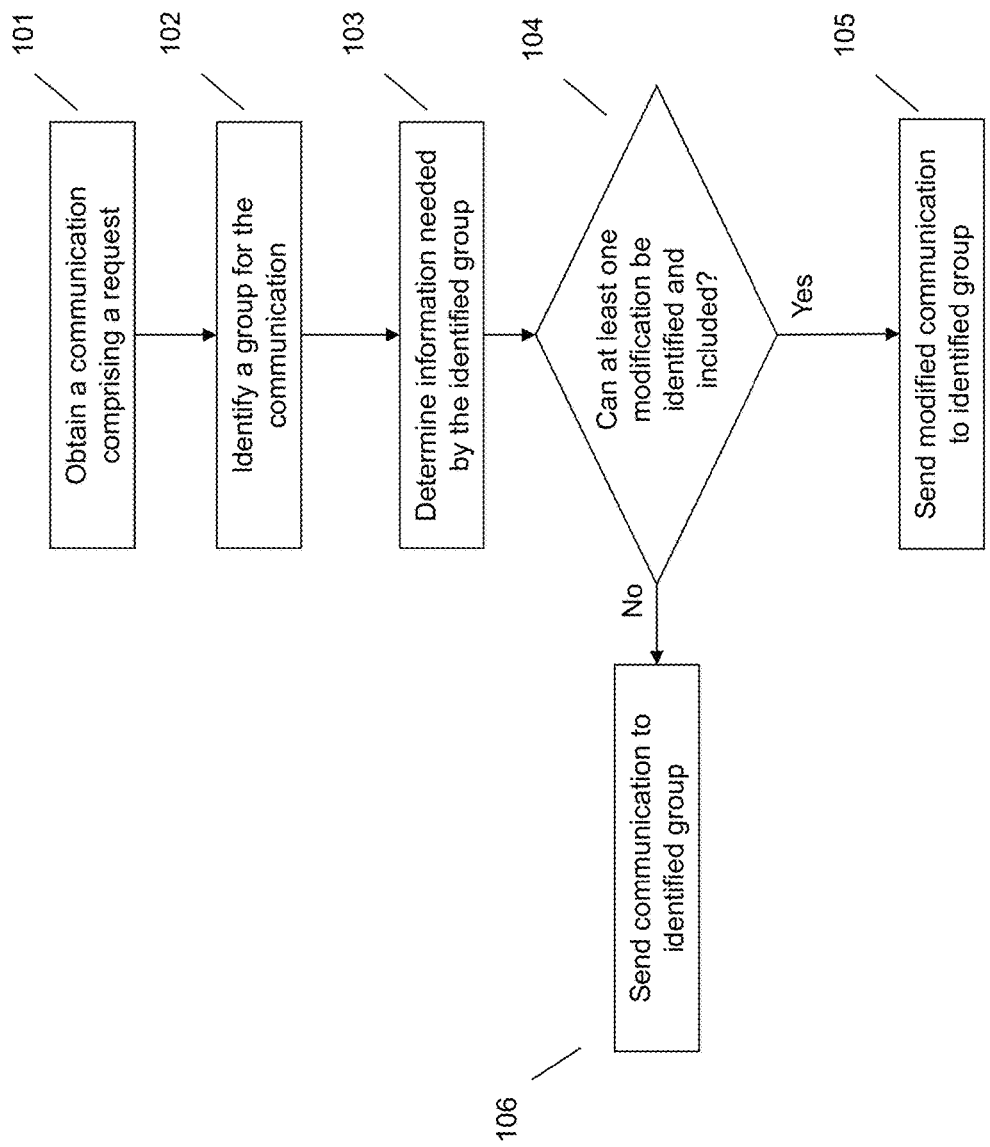
FIG. 1 illustrates a method of communication enrichment based upon an identified group that may provide assistance in resolving a request.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-4. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 4. In accordance with an example embodiment, all of the process steps, components and outputs discussed with respect to FIGS. 1-3 can be performed or utilized by way of a processing unit or units and system memory such as those indicated, respectively, at 16' and 28' in FIG. 4, whether on a server computer, a client computer, a node computer in a distributed network, or any combination thereof.

When a user has a problem or requires assistance, the user contacts a customer service center or help desk. This contact is generally a user writing an email or accessing a customer service or help desk application and filling out a form that requests information. The form usually includes a free form section where the user can provide details related to the request or problem to be resolved. The customer service center or help desk receives the email or other communication and a person responsible for directing the ticket to the appropriate group or person reads the communication, determines the problem, and manually assigns the ticket to a resolver team, or a team that provides assistance in resolving a request. If, after obtaining the communication, the resolver team determines that the ticket has been incorrectly directed, the resolver team returns the ticket to the group responsible for directing the ticket. These systems require the manual assignment of tickets and, therefore, take additional time, particularly if the ticket gets incorrectly assigned.

One current system attempts to automatically assign a ticket to a resolver group without the need for manual assignment. The system analyzes problem descriptions and communication content to determine the appropriate resolver group. One system uses previously assigned tickets to determine the most relevant assignee of the ticket. For example, the system may determine that all tickets that have particular words are assigned to a particular resolver group. Thus, any subsequent ticket having one or more of those words would be assigned to that same resolver group. The systems may also use classifiers to determine the correct resolver group. These systems may also have a provision for a custom rules engine where a user can provide rules that, if the communication meets the requirements of the rules, direct the system regarding which resolver group should receive the communication.

If, after obtaining the communication, the resolver team determines that it has been assigned to the correct group, the resolver team will attempt to resolve the request included in the communication. Some conventional systems may also attempt to automatically resolve the ticket by mining resolution steps of historical tickets that are similar in nature. However, sometimes the ticket does not contain enough information for either a person or the auto resolution system to resolve the ticket. Thus, sometimes in order to resolve a request, the customer service center or help desk must request additional information from the user. For example, if a user has submitted a ticket for assistance in resolving a problem with an application, the help desk may need information regarding the version of the application, the user credentials used to access the system, and the like. If the user did not provide this information in the initial request, the person resolving the request must contact the user for this additional information. As another example, if a user is requesting assistance in booking travel, the user may need to provide the details regarding the location, date of travel, manager approval, and the like. If the user has not provided all this information, the representative attempting to book the travel for the user must contact the user to obtain this additional information. This requires additional time and effort from both the user and the representative attempting to resolve or perform the request.

Some conventional systems may attempt to prevent some unnecessary communications by identifying that attachments that have been indicated are not actually attached to an email. For example, if the user indicates in the body of the communication that an attachment is included, but forgets to include the attachment, the conventional system may provide an indication to the user that no attachment has been included. These conventional systems usually look for specific words within the communication body (e.g., "attached", "attachment", "enclosed", etc.) to determine that an attachment may have been intended. However, these conventional systems cannot determine if the attachment is actually relevant, for example, if a user has inadvertently included the wrong attachment. Rather, the conventional systems determine that a user has indicated that an attachment is included, identify that no attachment has actually been added to the email, and then prompts the user for the attachment. Additionally, there is currently no system or method that would assist in preventing the request for additional information if the user has failed to provide all the information, separate from an attachment. In other words, the systems do not identify whether information that is necessary for resolving the request is included in the communication.

Accordingly, the techniques and systems as described herein provide a system and technique for enriching communications between users and customer service centers or help desks by identifying a group that is able to provide assistance in resolving the request and identifying information that should be included in the communication using a model corresponding to the resolver group. The system may obtain a communication comprising a request for assistance. For example, a user may create an email or fill out a helpdesk form requesting assistance. The request may include resolution of an error or problem occurring with an application, assistance in performing a task, or the like. Based upon the information within the obtained communication, the system may identify the group, or resolver group, that will provide assistance in resolving the request. For example, requests related to a particular application may be directed to a resolver group that specializes in issues related to that application.

Based upon the identified group, the system may access a model that is specific to that resolver group. The model may identify information that may be requested or needed by the resolver group in order to resolve requests. This information may be generated or identified using historical communications between the resolver group and users. Using the model, the system may determine a difference between the obtained communication and the information that has been identified as being necessary for the resolver group. For example, if the resolver group needs a particular screenshot that is not included in the obtained communication, the system may identify this as a difference. As another example, the system may identify a difference when the communication includes an attachment that does not appear to be relevant to the resolver group. As a final example, the system may identify a difference when the communication body is missing information that is needed by the resolver group. The system may then attempt to rectify the difference by adding the missing information, removing extraneous information, suggesting a modification to a user, or the like. The system may then send the modified communication to identified group. In other words, before sending the communication, the system attempts to include any information that may be needed by the resolver group.

Such a system provides a technical improvement over current systems for ticket resolution. The described systems and methods provide a technique for providing suggestions for modifying a communication for assistance based upon the identified group that may provide assistance in resolving a request. The suggestion may include a suggestion for a specific attachment, removal of an irrelevant attachment, or inclusion of information in the communication so that the resolver group is able to resolve the request without additional communications from the user. Rather than conventional systems that merely identify that an attachment was indicated but not included, the described systems and methods can identify a specific attachment that should be included. Additionally, the systems and methods as described herein can identify information that may be needed by the resolver group that is not currently included in the communication and either add the information or request the information from the user. Conventional systems do not have such a feature. Thus, the described systems and methods provide a technique for provision of a more complete original communication from the user which allows a quicker resolution of the request and requires less involvement from the user, thereby reducing the amount of time that has to be spent on the request and creating a more efficient resolution workflow.

FIG. 1 illustrates a method for enriching communications between users and customer service centers or help desks by identifying a potential group and identifying information that should be included in the communication using a model corresponding to the resolver group before the communication is sent to the resolver group. At 101 the system may obtain a communication comprising a request from a user for assistance. The communication may include any text based communication, including a voice communication converted to text using an automatic speech recognition system. For example, the communication may include an email prepared by the user to be sent to the help desk, customer service center, or other request resolution group. For ease of readability, the term "request resolution center" will be used here throughout, but is not intended to be limiting. As another example, the communication may include a submission on an application associated with the request resolution group, for example, a help desk ticket creation application, a form associated with the request resolution group, or the like.

Obtaining the communication may include receiving the communication from the user or an application, from the request resolution center, from an accessible data storage location, or the like. In other words, obtaining the communication may include receiving, accessing, or otherwise obtaining the communication. The request may be a request for resolution of an error or problem that the user is experiencing. For example, the user may be attempting to log into an application and is receiving error messages, thereby preventing the user from logging into the application. As another example, the user may be attempting to run a particular application and the application is not responding as the user is expecting. The request may also be a request for assistance in performing a task. For example, the user may need to book travel and must request assistance from a travel resolution center in order to book the travel. As another example, the user may need to order supplies and must request assistance from a supply resolution center in order to place the order for the supplies.

Using the obtained communication the system may identify a group that is able to provide assistance in resolving the request, also referred to as a resolver group, at 102. To identify a group the system may analyze information contained within the obtained communication, classify the obtained communication into a particular request type, and identify the resolver group that is associated with the request type. For example, the system may use a parsing technique to extract information from not only the communication but any files associated with the communication, for example, an attachment to the communication. Thus, the system may use a content parser on the body of the communication, including any subject lines, sender information lines, or the like, to extract content from the body of the communication. The system may also use an attachment parser to extract information from any attachments that may be included or associated with the communication.

To classify the obtained communication into a request type, the system may use historical information to learn patterns regarding which communications have been assigned to particular resolver groups. For example, the system may parse historical communications and identify keywords or intents included in the communications. The system may then identify particular keywords or intents as being directed to a particular resolver group. Thus, when subsequent communications are received, the system may parse the subsequent communication to identify the keywords and intents of this subsequent communication. The system may then identify a resolver group for the subsequent communication based upon a comparison between historical keywords and intents and the keywords and intents of the subsequent communication.

The system may also use classifiers to classify the communication into a particular group or subset that has been identified as being associated with a particular resolver group. The system may also include a provision for customer rules where a user can set rules regarding the directing of a communication. When a communication comes in that meets the requirements of the rule, the system will then associate the communication with that resolver group. Other known techniques for identifying a resolver group may additionally or alternatively be employed.

At 103 the system may use a model corresponding to the identified group to determine information that is needed by the resolver group to resolve the request. The model may identify information that is needed or desired by a resolver group to resolve a request. For example, the model may identify that a travel resolver group requires not only the location and time of travel, but also proof of manager approval for the travel. As another example, the model may identify that an application error resolver group requires a screenshot of the error, identification of the version of the application, identification of the version of an associated application, the date of error, and the like. Each model is specific to a resolver group. In other words, the model used for one resolver group may identify information different than that of the model used for a different resolver group. Additionally, the model may be specific to a particular request, or a particular person who addresses particular requests, within the resolver group. For example, an application resolver group may address not only logon issues, but also application server communication errors. Each of these requests may need different information to resolve the request. Thus, the model may be unique to the request type and the resolver group.

To generate a model the system may train the model using historical communications of the resolver group corresponding to the model. Using the historical communications the system may extract intents, concepts, key phrases, sender information, location, severity information, and the like, from a corpus of historical communications. This information not only assists in identifying the request type, but also assists in determining which information was provided by the sender, requested by the resolver group, used by the resolver group, and the like. From this information the system may build a supervised machine-learning model that can predict information that is needed by the resolver group. As an example, the model may identify which communications may need attachments. As another example, the model may identify the type and/or format of the attachment. As another example, to identify whether an attachment is relevant to the communication, the model may identify a relevance threshold between intent of a communication and an attachment.

As another example, the model may identify information, or key nuggets, that should be included in the body of the communication. These key nuggets may include information that is used by the resolver group to resolve the request. The system may also prioritize key nuggets based upon a relevance to the request type or category and different confidence parameters. For example, the system may determine that certain key nuggets are almost always used by a resolver group, whereas other key nuggets are only used when the request is of a particular type or category. Thus, the key nuggets that are always used may have a higher priority than the key nuggets that are only used for a particular request type. Additionally, if the system determines that the request is of the particular request type, the key nugget may then be given a higher priority. Therefore, if the key nugget has a particular relevance to the request type, the key nugget prioritization may change.

The system may determine if, at 104, at least one modification to the communication can be identified based upon the determined information included in the model. Identifying at least one modification may include determining a difference between the determined information and the information included in the obtained communication exists. To determine this difference the system may compare information that is extracted from the obtained communication to the information included in the model corresponding to the identified group. The difference may indicate that information that should be included is not included in the obtained communication. The difference may also indicate that information that is included with the communication should not be included or is irrelevant to the communication.

As an example, the model may indicate that a particular attachment should be included with the request. The system may identify that the particular attachment is not included with the communication, and may, therefore, identify that a difference exists. In the case that the system determines that an attachment should be included, the system may suggest a modification to the communication to add the attachment. This may include adding additional attachments or replacing included attachments. Not only can the system identify that an attachment should be included, but it can also identify the type of attachment. In other words, the system does not merely rely on the communication using the term "attachment", "attached", or the like. Rather, using the model, the system can determine not only the type of attachment (e.g., "sales invoice", "manager travel approval", "error log screen shot", etc.), but also the format of the attachment. For example, the resolver group may require particular attachments as .jpg, .png, .pdf, .doc, or the like, file types. Therefore, when providing the modification suggestion, the system may provide a specific suggestion regarding the exact attachment that should be included as an attachment, thereby addressing the determined difference.

As another example, the system may identify a difference exists if a communication includes an attachment that has a relevance level below the relevance threshold identified in the model. For example, the user may accidentally attach the incorrect file to the communication. The system may determine the relevance of the attachment to the communication by comparing information identifying the intent of the communication body to information extracted from the attachment. The system may then compute a relevance score between the communication body and the attachment. The relevance score may then be compared to a relevance score or relevance threshold identified in the model. If the relevance score, when compared to the model relevance score or relevance threshold, is below the threshold, the system may suggest a modification that the attachment be removed from the communication or request the user verify that this is the intended attachment, thereby addressing the determined difference.

Figure 2:
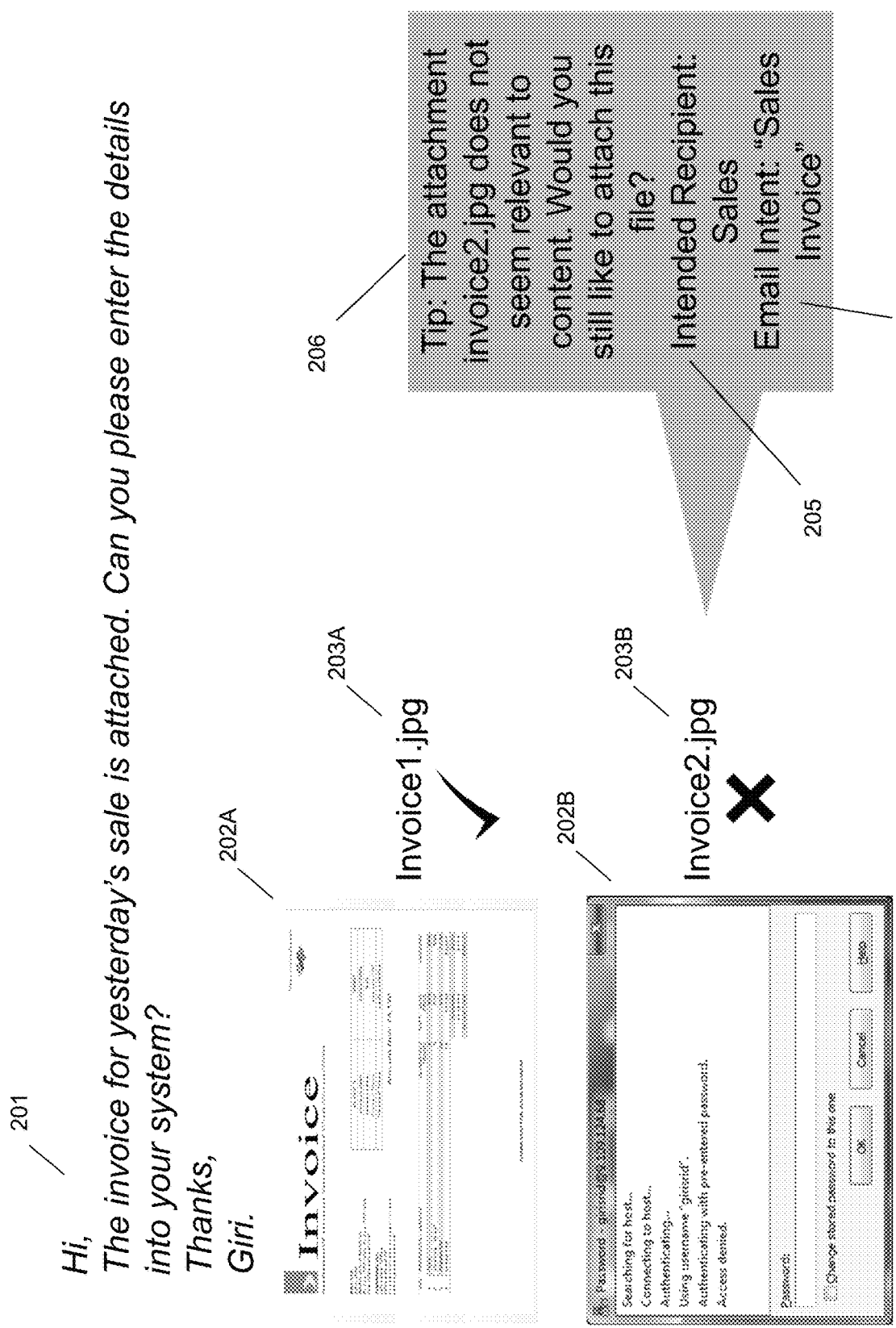
FIG. 2 illustrates an example communication enrichment by analysis of an attachment based upon an identified group that may provide assistance in resolving a request and content analysis.

For example, FIG. 2 illustrates an example attachment relevance analysis. The example includes a communication body 201 and includes two attachments 202A and 202B that have been included with the communication. The system parses the communication body 201 to determine that the email intent is "Sales Invoice" 204 and that the intended recipient is "Sales" 205, corresponding to the Sales resolver group. The system may also parse the attachment. The system not only parses the label of the attachment, but also parses the attachment itself, for example, using an image parsing technique, text parsing technique, or the like. The system may determine that the invoice attachment 202A has a high relevance to the communication. When the system compares this relevance to the relevance threshold of the model corresponding to the Sales resolver group, the system determines that the invoice attachment 202A meets the relevance threshold 203A. However, the system may determine that while the second attachment 202B has a name of "Invoice2.jpg" the actual attachment does not correspond to an invoice. The system may determine that the relevance of this attachment 202B is lower than the relevance threshold identified in the corresponding Sales resolver group model 203B. Therefore, the system may provide a tip 206 or suggested modification that the second attachment 202B does not seem relevant and should be removed.

As another example, the system may determine that the model indicates that a particular piece of information should be included in the communication, determine that this information piece is not included, and may then identify a difference. The system may then identify a modification that can be performed to address this difference. In other words, the system may identify a modification that can enrich the communication in order to minimize the likeliness that the resolver group has to request additional information from the user. The identified modification may include suggesting information that is included in the model and not the communication, for example, by providing a request or suggestion to the user to add additional information including identification of the information that needs to be added.

The identified modification may include the system automatically adding information to the communication that is indicated by the model but was not previously included in the communication. For example, the system may extract information from an attachment and add this information to the body of the communication in order to clarify the key information within the body of the communication. In other words, if the necessary information can be extracted from the attachments, the system may extract this information and add it to the body of the communication. As another example, the system may obtain information from a secondary information source and add the obtained information to the communication body to address the determined difference. For example, if the system identifies that an application version is missing, the system may access the application on the user's system and determine the version of the application and add it to the communication body. As another example, if the system determines that a date and time are missing, the system may access the system clock to determine the date and time. Other modifications may be performed, for example, changing the structure of the communication, generating a communication template, or the like.

Figure 3:
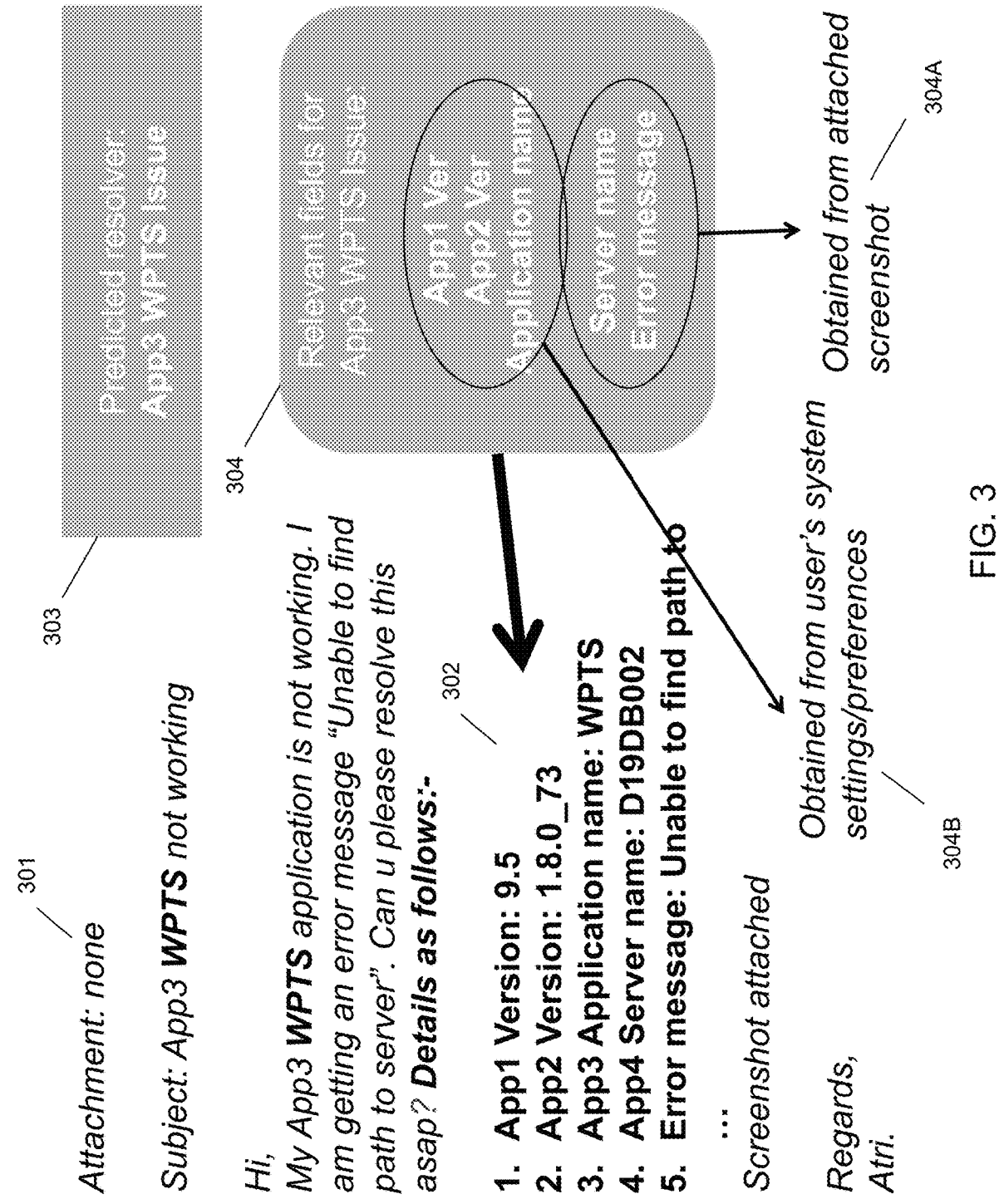
FIG. 3 illustrates an example communication enricher based upon an identified group that may provide assistance in resolving a request and content analysis.

FIG. 3 illustrates an example of communication enrichment. The original body of the communication 301 is shown in non-bolded text. Any modifications that were added by the system are identified in bolded text, for example, as shown at 302. The system has identified the identified group as "App3 WPTS Issue" 303. From the model corresponding to the App3 WPTS Issue resolver group, the system has identified the relevant fields or key information needed by the resolver group 304. The key information identified 304 includes identification of the version of App1, the version of App2, the application name, the server name, and the error message. The system identifies that the version of App1, the version of App2, and the application name can be identified and obtained from the user's system settings/preferences 304B. The system identifies that the server name and error message can be obtained from the attached screenshot 304A. The system then modifies the communication adding these details, for example, as shown in bold text 302.

If the system determines that a modification cannot be identified and/or included at 104, the system may send the communication as obtained to the identified group at 106. If, however, the system can either determine that a modification can be identified or included at 104, the system may send a modified communication to the resolver group at 105. The modified communication may include the original communication that includes one or more identified modifications incorporated into the communication, for example, the resulting communication shown in FIG. 3, including the original communication 301 and the included modifications, for example, 302.

Thus, the system provides a system and method that can identify differences between models corresponding to a resolver group and an obtained communication. The system can then make or suggest modifications to the communication in order to reduce the amount of time necessary for resolving the request, for example, by eliminating the need for the resolver group to contact the user for more information. Therefore, the described systems and methods provide a technical improvement to conventional systems for request resolution.

Figure 4:
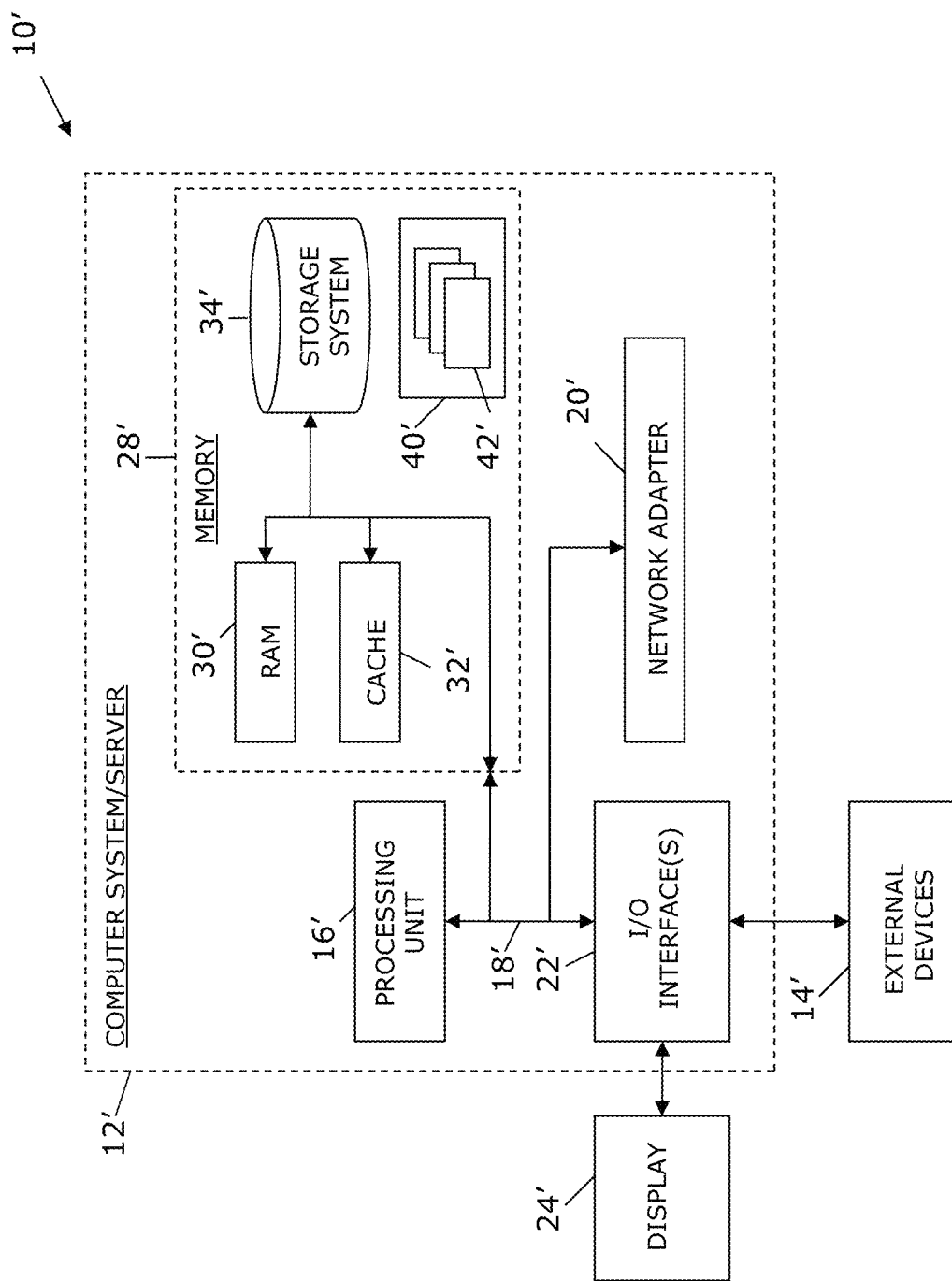
FIG. 4 illustrates a computer system.

As shown in FIG. 4, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for use within an organization having a plurality of resolver groups dedicated to providing assistance with requests, comprising:
    obtaining a communication comprising a request for assistance from a user;
    identifying, using information contained within the obtained communication, a resolver group that is able to provide assistance in resolving the request, each resolver group having a corresponding model identifying information needed by that resolver group for resolving requests;
    determining, based upon the model corresponding to the identified resolver group, information needed by the identified resolver group to resolve the request, wherein the model corresponding to the identified resolver group is trained using a plurality of historical communications that were assigned to the resolver group, wherein the model is generated using historical communications resolved by the identified group, wherein the training comprises extracting information from the plurality of historical communications to predict information needed by the resolver group;
    identifying at least one modification that needs to be made to the communication based upon the determined information, wherein the identifying at least one modification comprises determining a difference between the determined information and the information contained within the obtained communication; and
    sending a modified communication to the identified resolver group, wherein the modified communication comprises the obtained communication having at least one incorporated identified modification, wherein the at least one incorporated identified modification comprises (i) obtaining information from a secondary information source and (ii) adding the obtained information to the obtained communication as the at least one incorporated identified modification to address the determined difference.

2. The method of claim 1, wherein the determining a difference comprises determining that an attachment included with the communication is not relevant to the communication.

3. The method of claim 1, wherein the identifying at least one modification comprises requesting the user provide additional information addressing the determined difference.

4. The method of claim 1, wherein the identifying at least one modification comprises (i) extracting information from an attachment included within the communication and (ii) adding the extracted information to the obtained communication to address the determined difference.

5. The method of claim 1, wherein the obtaining information from a secondary information source comprises obtaining the secondary information source from the historical communications database.

6. The method of claim 1, wherein the identifying at least one modification comprises recommending an attachment to be added to the communication to address the determined difference.

7. The method of claim 1, wherein identifying at least one modification comprises (i) extracting information from the obtained communication by parsing the obtained communication and (ii) comparing the extracted information to the determined information.

8. The method of claim 1, wherein identifying a particular resolver group comprises (i) parsing information included in the obtained communication to classify the obtained communication into a request type and (ii) identifying the particular resolver group corresponding to the request type.

9. The method of claim 1, wherein the model is generated by (i) grouping the historical communications into categories of requests, (ii) parsing the historical communications and identifying information requested by the identified resolver group, and (iii) prioritizing the identified information based upon a relevance of the identified information to the category of the historical communication.

10. An apparatus for use within an organization having a plurality of resolver groups dedicated to providing assistance with requests, comprising:
at least one processor; and
a computer readable storage medium having computer readable program code embodied therewith and executable by the at least one processor, the computer readable program code comprising:
computer readable program code configured to obtain a communication comprising a request for assistance from a user;
computer readable program code configured to identify, using information contained within the obtained communication, a resolver group that is able to provide assistance in resolving the request, each resolver group having a corresponding model identifying information needed by that resolver group for resolving requests;
computer readable program code configured to determine, based upon the model corresponding to the identified resolver group, information needed by the identified resolver group to resolve the request, wherein the model corresponding to the identified resolver group is trained using a plurality of historical communications that were assigned to the resolver group, wherein the model is generated using historical communications resolved by the identified group, wherein the training comprises extracting information from the plurality of historical communications to predict information needed by the resolver group;
computer readable program code configured to identify at least one modification that needs to be made to the communication based upon the determined information, wherein the identifying at least one modification comprises determining a difference between the determined information and the information contained within the obtained communication; and
computer readable program code configured to send a modified communication to the identified resolver group, wherein the modified communication comprises the obtained communication having at least one incorporated identified modification, wherein the at least one incorporated identified modification comprises (i) obtaining information from a secondary information source and (ii) adding the obtained information to the obtained communication as the at least one incorporated identified modification to address the determined difference.

11. A computer program product for use within an organization having a plurality of resolver groups dedicated to providing assistance with requests, comprising:
a computer readable storage medium having computer readable program code embodied therewith, the computer readable program code executable by a processor and comprising:
computer readable program code configured to obtain a communication comprising a request for assistance from a user;
computer readable program code configured to identify, using information contained within the obtained communication, a resolver group that is able to provide assistance in resolving the request, each resolver group having a corresponding model identifying information needed by that resolver group for resolving requests;
computer readable program code configured to determine, based upon the model corresponding to the identified resolver group, information needed by the identified resolver group to resolve the request, wherein the model corresponding to the identified resolver group is trained using a plurality of historical communications that were assigned to the resolver group, wherein the model is generated using historical communications resolved by the identified group, wherein the training comprises extracting information from the plurality of historical communications to predict information needed by the resolver group;
computer readable program code configured to identify at least one modification that needs to be made to the communication based upon the determined information, wherein the identifying at least one modification comprises determining a difference between the determined information and the information contained within the obtained communication; and
computer readable program code configured to send a modified communication to the identified group, wherein the modified communication comprises the obtained communication having at least one incorporated identified modification, wherein the at least one incorporated identified modification comprises (i) obtaining information from a secondary information source and (ii) adding the obtained information to the obtained communication as the at least one incorporated identified modification to address the determined difference.

12. The computer program product of claim 11, wherein the determining a difference comprises determining an attachment included with the communication is not relevant to the communication.

13. The computer program product of claim 11, wherein the identifying at least one modification comprises requesting the user provide additional information addressing the determined difference.

14. The computer program product of claim 11, wherein the identifying at least one modification comprises (i) extracting information from an attachment included within the communication and (ii) adding the extracted information to the obtained communication to address the determined difference.

15. The computer program product of claim 11, wherein the obtaining information from a secondary information source comprises obtaining the secondary information source from the historical communications database.

16. The computer program product of claim 11, wherein the identifying at least one modification comprises recommending an attachment to be added to the communication to address the determined difference.

17. The computer program product of claim 11, wherein identifying at least one modification comprises (i) extracting information from the obtained communication by parsing the obtained communication and (ii) comparing the extracted information to the determined information.

18. The computer program product of claim 11, wherein the model is generated by (i) grouping the historical communications into categories of requests, (ii) parsing the historical communications and identifying information requested by the identified resolver group, and (iii) prioritizing the identified information based upon a relevance of the identified information to the category of the historical communication.

19. A method for use within an organization having a plurality of customer service resolution groups dedicated to providing assistance with requests, comprising:

obtaining a customer service communication, wherein the customer service communication comprises a request by a user for assistance;

identifying, using information included in the customer service communication, a customer service resolution group for resolving the request;

analyzing, using a model corresponding to the identified customer service resolution group and identifying information needed by the identified customer service resolution group to resolve requests, the obtained customer service communication and identifying at least one information component needed by the identified customer service resolution group and missing from the obtained customer service communication, wherein the model corresponding to the identified customer service resolution group is trained using a plurality of historical communications that were assigned to the customer service resolution group, wherein the training comprises extracting information from the plurality of historical communications to predict information needed by the customer service resolution group;

modifying the obtained customer service communication to include the missing at least one information component, wherein the modifying comprises (i) obtaining information from a secondary information source related to the missing at least one information component and (ii) adding the obtained information to the obtained communication to address the missing at least one information component; and sending the modified customer service communication to the identified customer service resolution group.

\* \* \* \* \*